United States Patent [19]

Nishikawa et al.

[11] Patent Number: 4,711,809
[45] Date of Patent: Dec. 8, 1987

[54] MAGNETIC RECORDING MEDIUM

[75] Inventors: Yasuo Nishikawa; Tsutomu Okita; Yoshito Mukaida, all of Kanagawa; Masahiro Niinomi, Tokyo; Kenji Yanagihara, Tokyo; Mituo Kimura, Tokyo, all of Japan

[73] Assignee: Fuji Photo Film Co., Ltd., Kanagawa, Japan

[21] Appl. No.: 654,286

[22] Filed: Sep. 25, 1984

[30] Foreign Application Priority Data

Sep. 26, 1983 [JP] Japan .................. 58-176388
Sep. 26, 1983 [JP] Japan .................. 58-176389

[51] Int. Cl.⁴ .................................. G11B 5/72
[52] U.S. Cl. ................................. 428/336; 427/41; 427/128; 427/131; 427/132; 428/421; 428/422; 428/694; 428/695; 428/900
[58] Field of Search ............... 427/41, 40, 131, 132, 427/128; 428/695, 694, 422, 421, 900, 336; 360/134–136

[56] References Cited

U.S. PATENT DOCUMENTS

| | | | |
|---|---|---|---|
| 4,382,985 | 5/1983 | Hattori | 427/41 |
| 4,391,843 | 7/1983 | Kaganowicz | 427/41 |
| 4,395,435 | 7/1983 | Sanpei | 427/41 |
| 4,419,404 | 12/1983 | Arai | 427/41 |
| 4,421,843 | 12/1983 | Hattori | 427/41 |
| 4,429,024 | 1/1984 | Ueno | 427/41 |
| 4,565,734 | 1/1986 | Arai | 428/900 |
| 4,582,746 | 4/1986 | Shirahata | 428/900 |

Primary Examiner—Ellis P. Robinson
Attorney, Agent, or Firm—Sughrue, Mion, Zinn, Macpeak & Seas

[57] ABSTRACT

A magnetic recording medium is disclosed which comprises a support having provided thereon a thin magnetic metal film, a plasma polymerized layer being provided on the thin magnetic film, in which the plasma polymerized layer is formed in a monomer gas or in a gas containing the monomer gas of at least one of compounds represented by the following general formulae (I) or (II),

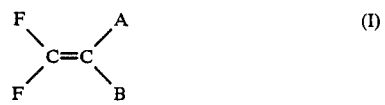

(I)

or

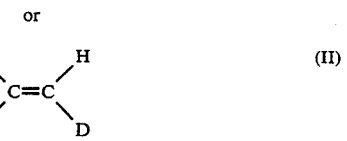

(II)

wherein A represents a hydrogen atom or a fluorine atom, B represents a hydrogen atom, a chlorine atom or an alkyl group having 1 to 4 carbon atoms, an alkenyl group having 2 to 4 carbon atoms, an alkoxy group having 1 to 4 carbon atoms, an alkanoyloxy group having 1 to 4 carbon atoms, which is unsubstituted or substituted with a fluorine atom, D represents a hydrogen atom, —R, —O—R,

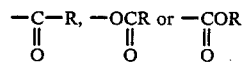

where R represents an alkyl group having 1 to 4 carbon atoms or an alkenyl group having 2 to 4 carbon atoms.

5 Claims, 1 Drawing Figure

MAGNETIC RECORDING MEDIUM

FIELD OF THE INVENTION

The present invention relates to a magnetic recording medium comprising a thin magnetic film as a magnetic recording layer, and more particularly it relates to a thin metal film type magnetic recording medium having excellent anti-corrosive properties, electromagnetic properties, running properties and wearing resistance.

BACKGROUND OF THE INVENTION

A coated type magnetic recording medium prepared by providing a non-magnetic support with a magnetic recording layer containing magnetic particles dispersed in a binder, followed by drying the magnetic recording layer has been widely used. Recently, attention has been directed to a thin metal film type magnetic recording medium comprising, as a magnetic recording layer, a thin ferromagnetic metal film prepared by a method wherein the film is formed in a vacuum chamber, e.g., by vacuum deposition, sputtering or ion-plating, or by a metal plating method such as electric-plating or electroless plating and has become of high practical value with increases in the demand for high density recording.

A thin metal film type magnetic recording medium is very effective in view of electromagnetic properties and is suitable for high density recording because ferromagnetic metal having high saturation magnetization can be fabricated into a very thin film without using a non-magnetic substance such as a binder.

However, one serious problem of the thin metal film type magnetic recording medium is that, with the passage of time after preparing the medium, the surface of metal film easily corrodes to lose its original excellent electromagnetic properties. To solve this problem, it has been proposed to provide a protective layer on a metal surface by coating a thermoplastic polymer as described in, for example, German Patent Application (OLS) No. 2,220,964 and No. GB-2106011A or a thermosetting polymer as described in, for Example, German Patent Application (OLS) No. 3,220,066 and Japanese Patent Application (OPI) No. 158037/82 (the term "OPI" as used herein means a "published unexamined Japanese patent application") on the metal surface. However, according to the method, the thickness of the protective layer is limited in that a spacing loss occurs between a magnetic head and a magnetic layer as the thickness increases, and hence satisfactory anti-corrosive properties cannot be achieved. It has been also known that anti-corrosive effect can be improved by nitrating the surface of the magnetic layer as disclosed in Japanese Patent Application (OPI) No. 33806/75 or by oxidizing the surface thereof as disclosed in Japanese Patent Publication No. 20025/67 corresponding to Canadian Pat. No. 846,765. However, these methods generally require a relatively long treating time, for example, from 10 minutes to 2 hours, and therefore with a short treating time, a satisfactory anti-corrosive effect cannot easily be obtained.

Another serious problem of the thin metal film type magnetic recording medium is that running properties and durability are poor, that is, a magnetic tape tends to stick to a tape path of magnetic tapes when the tape is made running on a tape deck and running is stopped or that the durability during still mode use is poor. To solve the above problem, a method has been proposed to provide a lubricating agent, such as a thermoplastic polymer, a thermosetting polymer, a fatty acid as described in, for example, Japanese Patent Application (OPI) No. 68930/81, or a fatty acid ester as described in, for example, Japanese Patent Application (OPI) No. 80827/81 on the thin ferromagnetic metal film. However, in this method, running properties or durability are still not completely satisfactory. To achieve satisfactory running properties and durability, the layer containing a lubricating agent must be made thick, thereby losing the electromagnetic properties due to spacing loss. That is, the thickness of the layer containing a lubricating agent must be thick in order to obtain satisfactory anti-corrosive effect, which is not preferable for electromagnetic properties.

The inventors of the present invention have made extensive studies and research, and as result, have finally reached the present invention.

SUMMARY OF THE INVENTION

An object of the present invention is to provide a thin metal film type magnetic recording medium having a protective layer which is extremely thin to minimize spacing loss between a magnetic head and a magnetic layer and which is excellent in anti-corrosive properties, running properties, and durability.

The above object can be achieved by the magnetic recording medium prepared by providing, on a thin magnetic metal film having provided on a support, a plasma polymerized layer which is formed in a monomer gas or in a gas containing the monomer gas of at least one compound represented by formulae (I) or (II),

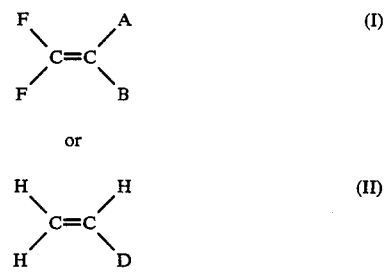

wherein A represents a hydrogen atom or a fluorine atom, B represents a hydrogen atom, a chlorine atom or an alkyl group having 1 to 4 carbon atoms, an alkenyl group having 2 to 4 carbon atoms, an alkoxy group having 1 to 4 carbon atoms, an alkanoyloxy group having 1 to 4 carbon atoms, which is unsubstituted or substituted with a fluorine atom, D represents a hydrogen atom, —R, —O—R,

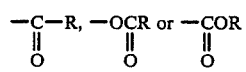

where R represents an alkyl group having 1 to 4 carbon atoms or an alkenyl group having 2 to 4 carbon atoms.

DETAILED DESCRIPTION OF THE INVENTION

Figure 1:
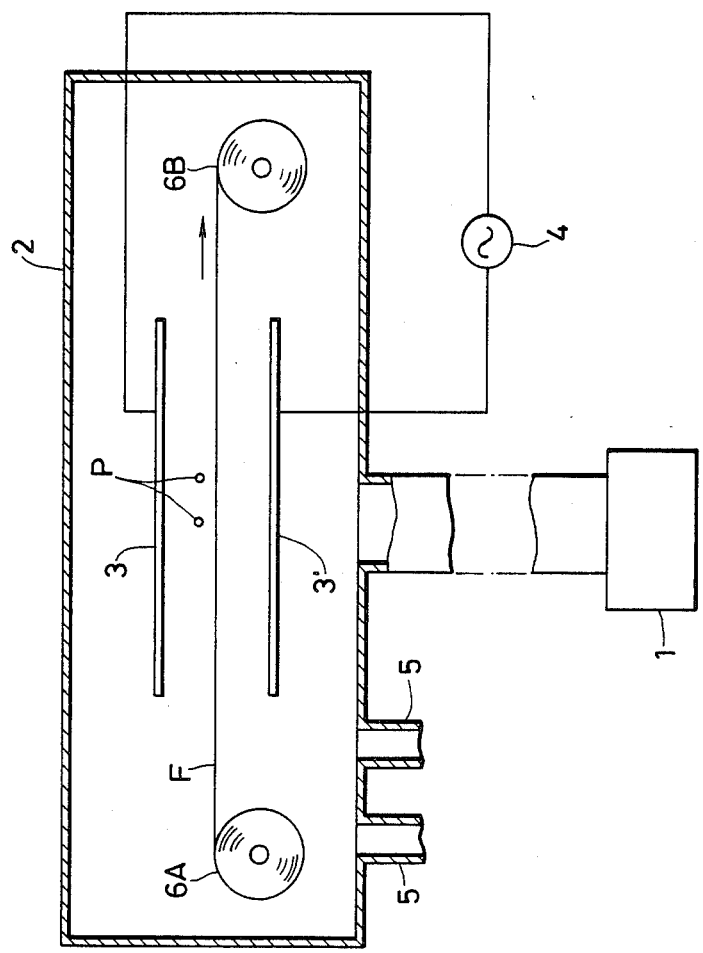
FIG. 1 is a cross-sectional view showing one preferred embodiment of an apparatus used for practicing a method of the present invention.

A plasma polymerized layer in the present invention is believed to be a uniformly thin layer provided on a thin metal film. Therefore, the magnetic recording medium of the present invention is excellent in anti-corrosive properties, because the plasma polymerized layer protects the thin metal film from oxygen and moisture which cause corrosion, and is also excellent in electromagnetic properties, because the plasma polymerized layer is extremely thin, thereby minimizing spacing loss between a magnetic head and the magnetic layer.

Supports that can be used in accordance with the present invention include cellulose acetate, cellulose nitrate, ethyl cellulose, methyl cellulose, polyamide, polymethyl methacrylate, polytetrafluoroethylene, polytrifluoroethylene, a polymer or a copolymer of α-olefin such as ethylene or propylene, a polymer or copolymer of vinyl chloride, polyvinylidene chloride, polycarbonate, polyimide, polyamide imide, and polyesters such as polyethylene terephthalate. Examples of preferred supports include polyimide, polyamide and polyethylene terephthalate.

The thin ferromagnetic metal film in accordance with the present invention can be prepared by a vapor deposition method or a metal plating method. The vapor deposition method is such a method that a substance or a compound to be deposited is evaporated or ionized in a gas such as oxygen or in vacuum to deposit out on a predetermined support. The method can comprise vacuum deposition as described in, for example, U.S. Pat. Nos. 3,342,632 and 3,342,633, sputtering as described in, for example, U.S. Pat. Nos. 3,856,579 and 3,624,849, ion plating as described in, for example, U.S. Pat. No. 4,002,546, ion beam deposition as described in, for example, J. L. Hughes: *J. Vac. Sci. Tech.*, 15 (4), 1572 (1978) or chemical phase metal plating as described in, for example, Japanese Patent Publication No. 21603/65. The metal plating method is such a method that a substance is formed as a layer on a support from a liquid phase by an electroplating method as described in, for example, U.S. Pat. No. 3,637,471 or an electroless plating method as described in, for example, U.S. Pat. No. 2,942,990. Preferred method is vacuum deposition. Useful materials for preparing the thin ferromagnetic metal film include Fe, Co, Ni and another ferromagnetic metal or alloy thereof, and Fe-Si, Fe-Rh, Fe-V, Fe-Ti, Co-P, Co-B, Co-Si, Co-V, Co-Y, Co-Sm, Co-Mn, Co-Ni-P, Co-Ni-B, Co-Cr, Co-Ni-Cr, Co-Ni-Ag, Co-Ni-Pd, Co-Ni-Zn, Co-Cu, Co-Ni-Cu, Co-W, Co-Ni-W, Co-Mn-P, Co-Sm-Cu, Co-Ni-Zn-P, and Co-V-Cr. Preferred thin ferromagnetic metal films contain 50 wt % or more Co.

The thickness of the thin ferromagnetic metal film for the magnetic recording medium of the present invention is generally from 0.02 nm to 5 nm, preferably 0.05 nm to 2 nm. The thickness of the support is preferably 4 nm to 50 nm. A subbing layer as described in, for example, Japanese Patent Publication No. 33522/79 can be provided on a support to improve close contact of the thin ferromagnetic film and magnetic properties. A backing layer as described in, for example, Japanese Patent Application (OPI) No. 154615/82 can be provided on a support opposite to the surface coated with the magnetic layer.

The shape of a magnetic recording medium can be a tape, a sheet, a card or a disc, and a preferred shape is a tape.

The monomer gas used for preparing the plasma polymerized layer of the present invention includes at least one compound represented by formula (I) or (II)

or

wherein A represents a hydrogen atom or a fluorine atom, B represents a hydrogen atom, a chlorine atom or an alkyl group having 1 to 4 carbon atoms, an alkenyl group having 2 to 4 carbon atoms, an alkoxy group having 1 to 4 carbon atoms, an alkanoyloxy group having 1 to 4 carbon atoms, which is unsubstituted or substituted with a fluorine atom, D represents a hydrogen atom, —R, —O—R,

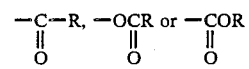

where R represents an alkyl group having 1 to 4 carbon atoms or an alkenyl group having 2 to 4 carbon atoms.

Specific examples of the compound represented by formula (I) include 1,1-difluoroethylene, trifluoroethylene, 1,1-difluorochloroethylene, 1,1-difluoropropylene, 1,1-difluorobutane, 1,1-difluorobutadiene, 1,1-difluorohexane, 1,1-difluoromethoxyethylene, 1,1-difluoroethoxyethylene, 1,1-diflurobuthoxyethylene, 1,1-difluroacetoxyethylene, 1,1,2-trifluorobutadiene and hexafluorobutadiene. Examples of preferred compounds include 1,1-difluoroethylene, trifluoroethylene, 1,1-difluorochloroethylene and hexafluorobutadiene. Most preferred are 1,1-difluoroethylene and trifluoroethylene. These monomer gases can be mixed in any proportions desired.

Specific examples of the compound represented by formula (II) include ethylene, propylene butene, pentene, hexene, butadiene, hexadiene, methyl vinyl ether, ethyl vinyl ether, butyl vinyl ether, methyl vinyl ketone, ethyl vinyl ketone, divinyl ketone, vinyl formate, vinyl acetate, vinyl butyrate, methyl acrylate, ethyl acrylate, propyl acrylate and butyl acrylate. Preferred compounds are ethylene, butadiene and propylene. These compounds can be used in admixture in any proportions desired.

The plasma polymerized layer which is provided on a thin magnetic metal film according to the present invention can be prepared as described in, for example, U.S. Pat. Nos. 4,419,404 and 4,429,024.

More particularly, the plasma polymerized layer is formed by using a monomer gas as described hereinbefore, generating plasma in the following manner and depositing it on a thin magnetic metal film.

An inert gas such as argon, helium, neon or krypton can be added into the monomer gas. These gases can be used in admixture in any proportions desired. Preferred inert gas is argon since it is inexpensive.

The energy density required for supplying plasma (a value obtained by dividing electric power supplied by a volume between electrodes in the case of parallel plate-like electrodes) should be adjusted to 0.002 w/cm$^3$ to 0.5 w/cm$^3$ and preferably 0.005 to 0.2 w/cm$^3$ in order to excite the plasma. That is, any one of direct current discharge, low frequency discharge (several hundred KHz to several ten MHz), microwave discharge, cathode ray tube heating type discharge and laser discharge as described in, for example, Thompson et al: *J. Appl. Poly. Sci.*, 16, 2291 (1972) can be used. Electrodes can be a parallel plate-like shape or a coil shape. The place where plasma polymerization is conducted is generally near the electrodes. The place can be anywhere provided that energy density can meet the above-described requirement. When the energy density is less than 0.002 w/cm$^3$, the speed of polymerization is especially low and is of no practical value. When the energy density is more than 0.5 w/cm$^3$, it is difficult to provide a homogeneous polymerization layer without any pinhole.

Electron temperature (Te) is preferably 5,000° C. to 70,000° C., more preferably 5,000° C. to 40,000° C. Te can be measured, for example, by a two-detective needle method using heated detective needles, as disclosed in Japanese Patent Application (OPI) NO. 135574/79. When Te is 70,000° C. or more, it is difficult to provide a homogeneous plasma polymerized layer without pinholes. When Te is 5,000° C. or lower, the speed of polymerization is low and is of no practical value. When Te is between 5,000° C. and 40,000° C., close contact between a plasma polymerized layer and a thin magnetic layer is particularly excellent and an excellent plasma polymerized layer can be provided.

A monomer gas or a mixture of a monomer gas and an inert gas is continuously introduced or flown into a reaction vessel. Flow rate per an hour depends upon the size of a reaction vessel. When the volume of a reaction vessel is 100, the flow rate of a monomer gas is preferably 1 to 100 cc (STP)/min.

The thickness of the polymerized layer of the present invention is preferbly from 2 nm to 100 nm, and more preferably from 2 nm to 40 nm. Electromagnetic properties of the tape comprising a plasma polymerized layer having a thickness of 40 nm or more are inferior to those having a thickness of 40 nm or less. When the thickness is 2 nm or less, finely small pinholes are often formed, thereby causing rust spots.

The pressure of the system for preparing the plasma polymerized layer is preferably from 10$^{-3}$ Torr to 1 Torr and more preferably from 10$^{-3}$ Torr to 10$^{-2}$ Torr.

Referring again to FIG. 1, the apparatus illustrated is comprised of a vacuum chamber 2, in which a pair of plate-like electrodes 3 and 3' are installed, and are connected with, for example, an alternative electric source 4. A vacuum pump 1 and at least one of monomer gas supply pipe 5 are connected to the vacuum chamber 2. For example, a long base film F comprising a support having coated thereon a magnetic layer passes between electrodes 3 and 3' by means of a supply roll 6A and a wind-up roll 6B to prepare a protective layer on a magnetic recording medium as follows.

That is, while the vacuum chamber 2 is evacuated by the vacuum pump 1, the above-described monomer gas where an inert gas can be contained is introduced into the vacuum chamber 2.

While maintaining the atmosphere of the vacuum chamber 2 as above, electric power is supplied to the electrodes 3 and 3' through an alternating current electric source 4, thereby causing discharge between the electrodes 3 and 3', and the plasma. Energy density of the plasma at the place where the base film F passes between the electrodes 3 and 3' is 0.002 w/cm$^3$ to 0.5 w/cm$^3$ (Te is 5,000° C. to 70,000° C.). On the base film F which is supplied from the roll 6A and passes plasma there is continuously formed a protective layer by the monomer gas plasma polymerization, and the resulting magnetic recording medium is wound up by the roll 6B.

The maximum vacuum degree in the vacuum chamber 2 is preferably 10$^{-5}$ Torr or less, and the vacuum degree at the time of plasma generation is generally from 10$^{-3}$ Torr to 1 Torr, and preferably is from 10$^{-3}$ to 10$^{-2}$ Torr.

In accordance with the above described manner, a protective layer is formed on a base film by a plasma polymerization. This protective layer, being much thinner than protective layers prepared in a conventional manner, has higher hardness, lower gas transmission, and higher mechanical strength because of higher density, and a low coefficient of friction.

A lubricating agent such as a higher fatty acid, a fatty acid ester, a fatty acid amide, a fluoride type compound or a silicone type compound as described in, for example, U.S. Pat. Nos. 4,267,238 and 4,268,556 can be provided on thus prepared plasma polymerized layer. Preferred lubricating agent includes fatty acids or fatty acid esters having 8 to 30 carbon atoms.

The present invention is illustrated in more detail by the following Example and Comparative Example. All parts are by weight.

EXAMPLES

A magnetic recording medium comprising a polyethylene terephthalate support having a thickness of 12 nm and having provided thereon a Co-Ni (Ni 20 wt %) magnetic thin film having a thickness of 100 nm by an oblique vapor deposition method was employed for the following experiment. A plasma polymerized layer was provided on the thin magnetic metal film under the conditions shown in Table 1 and using the apparatus as illustrated in FIG. 1.

TABLE 1

| Sample No. | | Monomer Gas | Flow Amount of Gas (normal condition ml/min.) | Pressure (m Torr) | Electric Current for Discharge (mA) | Web Carrying speed (m/min.) |
|---|---|---|---|---|---|---|
| 1 | Example 1 | CF$_2$=CH$_2$ | 20 | 50 | 25 | 0.4 |
| 2 | Comparative Example 1 | CH$_3$CH$_3$ | 20 | 50 | 60 | 0.1 |
| 3 | Comparative Example 2 | CH$_4$ | 20 | 50 | 50 | 0.2 |
| 4 | Comparative Example 3 | CHF=CHF | 20 | 50 | 30 | 0.2 |
| 5 | Comparative | CF$_2$=CF$_2$ | 20 | 50 | 30 | 0.2 |

TABLE 1-continued

| Sample No. | | Monomer Gas | Flow Amount of Gas (normal condition ml/min.) | Pressure (m Torr) | Electric Current for Discharge (mA) | Web Carrying speed (m/min.) |
|---|---|---|---|---|---|---|
| | Example 4 | | | | | |
| 6 | Example 2 | $CF_2=CHF$ | 40 | 50 | 30 | 0.2 |
| 7 | Example 3 | $CF_2=CHCH_3$ | 20 | 50 | 30 | 0.3 |
| 8 | Example 4 | $CF_2=CHCl$ | 30 | 60 | 35 | 0.2 |
| 9 | Example 5 | $CF_2=CFCF=CF_2$ | 10 | 20 | 70 | 0.3 |
| 10 | Example 6 | a mixture of $CF_2=CH_2$ and $CF_2CHF$ (1/1) | 30 | 100 | 35 | 0.2 |
| 11 | Example 7 | $CH_2=CH_2$ | 20 | 50 | 30 | 0.3 |
| 12 | Comparative Example 5 | $CH_4$ | 20 | 50 | 50 | 0.2 |
| 13 | Comparative Example 6 | $C_2H_6$ | 20 | 50 | 30 | 0.2 |
| 14 | Comparative Example 7 | $CF_2=CF_2$ | 20 | 50 | 30 | 0.4 |
| 15 | Example 8 | $CH_2=CHCH=CH_2$ | 20 | 30 | 30 | 0.3 |
| 16 | Example 9 | $CH_2=CHCH_3$ | 30 | 50 | 100 | 0.3 |
| 17 | Example 10 | $CH_2=CHCO_2CH_3$ | 30 | 100 | 30 | 0.5 |
| 18 | Example 11 | $CH_2=CHCCH_3$ $\parallel$ $O$ | 10 | 50 | 50 | 0.3 |
| 19 | Example 12 | a mixture of $CH_2=CH_2$ and $CH_2=CHCH=CH_2$ (1/1) | 30 | 50 | 20 | 0.2 |

For further comparison, Sample Nos. 20 and 21 (Comparative Examples 8 and 9, respectively) were prepared by coating the following coating compositions having a lubricating agent I and II on a magnetic layer and drying to provide a dry thickness of 10 nm, respectively.

| Coating composition containing a lubricating agent I: | |
|---|---|
| Capric Acid | 2 parts |
| Hexane | 500 parts |
| Coating composition containing a lubricating agent II: | |
| Copolymer of 1,1-dichloroethylene and acrylonitrile | 2 parts |
| Methyl ethyl ketone | 500 parts |

Tests with regards to Sample Nos. 1 to 12 were conducted in the following manner. The results thereof are shown in Table 2.

(1) Anti-corrosive properties:
Sample tapes were allowed to stand for 7 days at 60° C. and 80% RH (relative humidity) and occurrences of rust were visually observed.

(2) Running properties:
Sample tapes were slit to a width of ½ inch and were mounted on a video tape recorder ("NV8310" manufactured by Matsushita electric Co., Ltd.) in which the tape tension measured for sending out the tape out of the rotating cylinder was $T_1$ and the tape tension for winding it up was $T_2$.
The coefficient of friction ($\mu$) was calculated by the formula $T_2/T_1=\exp(\mu\pi)$. $T_1$ and $T_2$ were measured at 23° C. and 65% RH.

(3) Durability:
Still durability (min.) was determined using a home size video tape recorder (trade mark: "3600" manufactured by Victor Co., Ltd.) at 23° C. and 65% RH.

(4) Thickness of plasma polymerized layer:
The thickness was measured by a crystal oscillator in the manner described in manual for Digital Thickness Monitor Model DTM-200 manufactured by Sloan Co. Samples having a thin polymerized layer were prepared by decreasing the web speed so that the thickness of the layer was not less than 100 nm and by calculating the deposition time between the electrodes.

TABLE 2

| Sample No. | Thickness (nm) | Anti-Corrosive Properties | Coefficient of Friction ($\mu$) | Still Durability (min.) |
|---|---|---|---|---|
| 1 | 10 | No change | 0.25 | 15 or more |
| 2 | 10 | Color change on the whole surface | 0.38 | 1 or less |
| 3 | 15 | 70% of the surface of the thin magnetic film changed color | 0.40 | " |
| 4 | 13 | 50% of the surface of the thin magnetic film changed color | 0.39 | " |
| 5 | 12 | Color changed on the whole surface | 0.42 | " |
| 6 | 5 | No change | 0.26 | 15 or more |
| 7 | 15 | " | 0.27 | " |
| 8 | 8 | " | 0.26 | " |
| 9 | 10 | " | 0.25 | " |
| 10 | 13 | " | 0.26 | " |
| 11 | 10 | " | 0.26 | 15 or more |
| 12 | 12 | 70% of the surface of the thin magnetic film changed color | 0.40 | 1 or less |
| 13 | 10 | 50% of the surface of the thin magnetic film changed color | 0.40 | " |
| 14 | 15 | Color changed on the whole surface | 0.45 | " |
| 15 | 10 | No change | 0.28 | 15 or more |
| 16 | 7 | " | 0.29 | " |
| 17 | 5 | " | 0.27 | " |
| 18 | 10 | " | 0.29 | " |
| 19 | 13 | " | 0.29 | " |
| 20 | 10 | 30% of the surface of the thin magnetic film changed color | 0.40 | 1 |
| 21 | 10 | Color changed on the whole surface | 0.45 | 2 |

It is clear from Table 2 that a thin metal film type magnetic recording medium comprising a plasma polymerized layer is more excellent particularly in anti-corrosive properties, running properties and durability than the magnetic recording medium comprising a conventional protective layer containing a lubricating agent and a resin.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a support having provided thereon a thin magnetic metal film, and a plasma polymerized layer provided on the thin magnetic film, wherein said plasma polymerized layer is formed in a monomer gas or in a gas containing the monomer gas, wherein the monomer gas or in a gas containing the monomer gas, wherein the monomer gas is at least one of 1,1-difluoroethylene, trifluoroethylene, 1,1-difluorochloroethylene, and hexafluorobutadiene, wherein said plasma polymerized layer is formed at a pressure of $10^{-3}$ Torr to 1 Torr, wherein the thickness of the plasma polymerized layer is from 2 nm to 100 nm, and wherein the plasma polymerized layer is homogeneous in nature.

2. A magnetic recording medium comprising a support having provided thereon a thin magnetic metal film, and a plasma polymerized layer provided on the thin magnetic film, wherein said plasma polymerized layer is formed in a monomer gas or in a gas containing the monomer gas, wherein the monomer gas is trifluoroethylene, 1,1-difluoroethylene, or a mixture thereof, wherein said plasma polymerized layer is formed at a pressure of $10^{-3}$ Torr to 1 Torr, wherein the thickness of the plasma polymerized layer is from 2 nm to 100 nm, and wherein the plasma polymerized layer is homogenous in nature.

3. A magnetic recording medium as in claim 2, wherein the thickness of the plasma polymerized layer is from 2 nm to 40 nm.

4. A method of forming a plasma polymerized layer on a thin magnetic metal film provided on a support forming a magnetic recording medium, comprising subjecting the thin magnetic film to plasma generated between two electrodes in a vacuum chamber containing a monomer gas or a gas containing the monomer gas, the monomer gas being at least one of 1,1-difluoroethylene, trifluoroethylene, 1,1-difluorochloroethylene and hexafluorobutadiene, wherein said vacuum chamber is maintained at from $10^{-3}$ Torr, wherein the thickness of the plasma polymerized layer is from 2 nm to 100 nm, and wherein the plasma polymerized layer is homogeneous in nature.

5. A method of forming a plasma polymerized layer on a thin magnetic metal film provided on a support forming a magnetic recording medium, comprising subjecting the thin magnetic film to plasma generated between two electrodes in a vacuum chamber containing a monomer gas or a gas containing the monomer gas, the monomer gas being at least one of trifluoroethylene, 1,1-difluoroethylene, or a mixture thereof, wherein said vacuum chamber is maintained at from $10^{-3}$ Torr to 1 Torr, wherein the thickness of the plasma polymerized layer is from 2 nm to 100 nm, and wherein the plasma polymerized layer is homogeneous in nature.

* * * * *